US012304775B2

(12) United States Patent
Jussila et al.

(10) Patent No.: US 12,304,775 B2
(45) Date of Patent: May 20, 2025

(54) METHOD AND AN ELEVATOR SYSTEM FOR PERFORMING A SYNCHRONIZATION RUN OF AN ELEVATOR CAR

(71) Applicant: Kone Corporation, Helsinki (FI)

(72) Inventors: Ari Jussila, Helsinki (FI); Toni Hirvonen, Helsinki (FI); Ari Kattainen, Helsinki (FI); Antti Hovi, Helsinki (FI)

(73) Assignee: Kone Corporation, Helsinki (FI)

( * ) Notice: Subject to any disclaimer, the term of this patent is extended or adjusted under 35 U.S.C. 154(b) by 1570 days.

(21) Appl. No.: 16/530,001

(22) Filed: Aug. 2, 2019

(65) Prior Publication Data

US 2019/0352130 A1 Nov. 21, 2019

Related U.S. Application Data

(63) Continuation of application No. PCT/EP2018/053409, filed on Feb. 12, 2018.

(30) Foreign Application Priority Data

Feb. 10, 2017 (EP) .................................... 17155574

(51) Int. Cl.
*B66B 1/34* (2006.01)
*B66B 5/00* (2006.01)
*B66B 7/12* (2006.01)

(52) U.S. Cl.
CPC .......... *B66B 1/3492* (2013.01); *B66B 1/3446* (2013.01); *B66B 5/0031* (2013.01); *B66B 7/123* (2013.01)

(58) Field of Classification Search
CPC ....... B66B 5/0031; B66B 1/3492; B66B 3/00; B66B 1/24; B66B 1/3415; B66B 3/02;
(Continued)

(56) References Cited

U.S. PATENT DOCUMENTS

2015/0217968 A1 8/2015 Huff et al.
2019/0248625 A1* 8/2019 Mustonen ............. B66B 5/0037
2020/0024105 A1* 1/2020 Lampinen ................ B66B 5/02

FOREIGN PATENT DOCUMENTS

CH 690679 A5 * 12/2000 ........... B66B 1/3492
EP 2380841 10/2011
(Continued)

OTHER PUBLICATIONS

International Search Report PCT/ISA/210 for International Application No. PCT/EP2018/053409 Dated Jun. 19, 2018.
(Continued)

*Primary Examiner* — Jeffrey Donels
(74) *Attorney, Agent, or Firm* — Harness, Dickey & Pierce, P.L.C.

(57) ABSTRACT

A method for performing a synchronization run for an elevator car stopped between floors—upon initiating the synchronization run, driving the elevator car at a low speed in order to detect a first magnet of the elevator shaft, detecting the first magnet of the elevator shaft, comparing the identification code of the detected first magnet to stored pre-information in order to identify the detected first magnet, in response to identification of the first magnet, generating a control signal to the elevator car to travel up to an elevator rated speed, and driving an elevator car with an elevator rated speed.

17 Claims, 5 Drawing Sheets

(58) Field of Classification Search
CPC ... B66B 5/0018; B66B 1/3446; B66B 5/0006; B66B 1/36; B66B 5/028; B66B 5/04; B66B 13/14
See application file for complete search history.

(56) References Cited

FOREIGN PATENT DOCUMENTS

| | | | | | |
|---|---|---|---|---|---|
| EP | 3360833 | A1 | * | 8/2018 | B66B 1/3446 |
| EP | 3527522 | A1 | * | 8/2019 | B66B 1/3461 |
| FI | 118382 | B | * | 10/2007 | |
| FI | 118640 | B | * | 1/2008 | |
| KR | 101545800 | B1 | * | 8/2015 | |
| WO | WO-2011158301 | A1 | * | 12/2011 | B66B 5/0031 |
| WO | WO-2014184869 | A1 | * | 11/2014 | B66B 1/3492 |

OTHER PUBLICATIONS

Written Opinion of the International Searching Authority PCT/ISA/237 for International Application No. PCT/EP2018/053409 dated Jun. 19, 2018.

* cited by examiner

METHOD AND AN ELEVATOR SYSTEM FOR PERFORMING A SYNCHRONIZATION RUN OF AN ELEVATOR CAR

CROSS-REFERENCE TO RELATED APPLICATION

This application is a continuation of PCT International Application No. PCT/EP2018/053409 which has an International filing date of Feb. 12, 2018, and which claims priority to European patent application number 17155574.1 filed Feb. 10, 2017, the entire contents of both of which are incorporated herein by reference.

TECHNICAL FIELD

The invention concerns in general the technical field of an elevator technology. Especially, the invention concerns enhancing the safety of an elevator.

BACKGROUND

An elevator comprises typically an elevator car and a hoisting machine configured to drive the elevator car in an elevator shaft between the landings. For safety reasons the vertical position of the elevator car inside the elevator shaft in relation to the landings, i.e. absolute positioning, may be needed to be defined under certain conditions. In some circumstances the absolute position information may need to be known with an accuracy of approximately 10 mm. Examples of that kind of conditions may be elevators having reduced stroke buffers or in elevators used in a certain geographical location. Furthermore, the absolute positioning may be useful when implementing some safety functions of an elevator. In order to enhance the safety of an elevator system, the absolute positioning may be implemented to be independent from a drive control system of the elevator.

Preferably, the absolute positioning may be implemented by means of a component that fulfills the accuracy requirements. A Safety Integrity Level (SIL) may be used to indicate a tolerable failure rate of a particular safety function, for example a safety component. SIL is defined as a relative level of risk-reduction provided by the safety function, or to specify a target level of risk reduction. SIL has a number scheme from 1 to 4 to represent its levels. The higher the SIL level is, the greater the impact of a failure is and the lower the failure rate that is acceptable is.

According to one prior art solution absolute positioning of an elevator car is implemented by means of an ultrasonic position system (UPS) comprising a transmitter arranged on the elevator car, a first receiver at the upper end of the elevator shaft, and a second receiver at the bottom of the elevator shaft. The transmitter feeds an ultrasonic impulse into a signal wire running vertically through the elevator shaft between the first and the second receivers. Some of the drawbacks of this prior art solution are the expensive equipment and special material and high cost of the signal wire. Furthermore, the travelling height, i.e., the length in the vertical direction inside the elevator shaft is limited.

According to another prior art solution absolute positioning of an elevator car may be implemented by means of a magnetic tape installed along the elevator shaft and a reader having Hall sensors arranged on the elevator car. Some of the drawbacks of this prior art solution are the high cost of the magnetic tape and in some versions of this solution also the travelling height may be limited.

According to yet another prior art solution the absolute positioning of an elevator car may be implemented by means of a code tape mounted along the elevator shaft and an optical camera arranged on the elevator car. The code tape may be mounted to the elevator shaft with mounting clips containing a position indicator that enables floor level identification without the need for additional sensors. One of the drawbacks of this prior art solution is the high cost of code tape. Furthermore, the mounting clips may not be used to identify which landing door is on front side of the elevator car and which landing door is on rear side of the elevator car.

Thus, there is a need to further develop the absolute positioning solutions in an elevator system.

SUMMARY

An objective of the invention is to present a method for performing a synchronization run and an elevator system using said method.

The objectives of the invention are reached by a method and an elevator system as defined by the respective independent claims.

A first aspect of the invention is a method for performing a synchronization run of an elevator stopped between floors. The method comprises: upon initiating the synchronization run, driving an elevator at a low speed in order to detect a first magnet of the elevator shaft, detecting a first magnet of the elevator shaft, comparing the identification code of the detected first magnet to the stored pre-information in order to identify the detected first magnet, and in response to identification of the first magnet, generating a control signal to the elevator car to raise the elevator speed.

A second aspect of the invention is an elevator system for defining absolute position information of an elevator car, the elevator system comprising an elevator control unit, a pulse sensor unit, a door zone sensor unit and a safety control unit configured to obtain continuously a pulse position information of the elevator car from the pulse sensor unit, and define an absolute position information of the elevator car by adding a predefined correction value to the obtained pulse position information of the elevator car, wherein the predefined correction value indicates a drift between the obtained pulse position information of the elevator car and the actual pulse position of the elevator car. The elevator control unit, the safety control unit, the door zone sensor unit, and pulse sensor unit are communicatively coupled to each other, and the elevator control unit is configured to perform a synchronization run according to the first aspect.

This means that elevator car may reach landing faster that in traditional synchronization runs, especially in elevator shafts where there is a very long distance between consecutive landings. Thus recovery after stopping between floors may also take place quicker.

According to an embodiment of the first aspect, in response to identification of the first magnet, generating a control signal to the elevator car to travel up to an elevator rated speed, and driving an elevator with an elevator rated speed.

According to an embodiment of the first aspect, detecting a second magnet of the elevator shaft, comparing the identification code of the detected second magnet to the stored pre-information in order to identify the detected second magnet, obtaining from the stored pre-information the pulse position information of the magnet corresponding to the detected second magnet, defining a pulse position distance between the detected first magnet and the detected second magnet, and comparing the defined distance between the detected first magnet and the detected second magnet to the corresponding distance defined based on the pre-information, and generating a control signal to change the elevator speed in accordance with the comparison result.

According to an embodiment of the first aspect, wherein the elevator rated speed is the maximum speed limit defined for the elevator car or a buffer rated speed.

According to a refinement of the first aspect, wherein the first magnet and/or the second magnet is a door zone magnet. According to some embodiments of the first aspect, additionally or alternatively, the first magnet and/or the second magnet may be a different magnet such as a magnet defining end limit for elevator car movement in elevator shaft, or a magnet defining deceleration point for an elevator car travel to a given destination floor, or an extra magnet identifying a reference point in elevator shaft for car positioning.

According to an embodiment of the first aspect, the method comprises: obtaining continuously a pulse position information of the elevator car, and defining an absolute position information of the elevator car by adding a predefined correction value to the obtained pulse position information of the elevator car, wherein the predefined correction value indicates a drift between the obtained pulse position information of the elevator car and the actual pulse position of the elevator car.

According to an embodiment of the first aspect, wherein the pulse position information of the elevator car is obtained from a pulse sensor unit comprising: at least one quadrature sensor measuring incremental pulses from a rotating magnet ring arranged in an overspeed governor arranged in the elevator shaft.

According to an embodiment of the first aspect, wherein a pre-information about at least one door zone magnet at a door zone of each floor of an elevator shaft is obtained and stored during a setup run, the pre-information comprising the following: floor number, identification code, magnet type, pulse position information, linear position information.

According to an embodiment of the first aspect, wherein the floor number, identification code, magnet type, and the linear position of the elevator car within the door zone is obtained from at least one door zone sensor unit comprising at least one Hall sensor and a RFID reader.

According to an embodiment of the first aspect, wherein the predefined correction value is defined during the synchronization run, the method comprising: obtaining from the stored pre-information the pulse position information of the door zone magnet corresponding to the detected first door zone magnet, and defining the correction value by subtracting the pulse position information of the elevator car at the detection position of the first door zone magnet from the stored pulse position information of the door zone magnet corresponding to the detected first door zone magnet.

According to an embodiment of the first aspect, wherein the method comprising defining the absolute position information at two channels.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the invention are illustrated by way of example, and not by way of limitation, in the figures of the accompanying drawings.

DESCRIPTION OF SOME EMBODIMENTS

Figure 1:
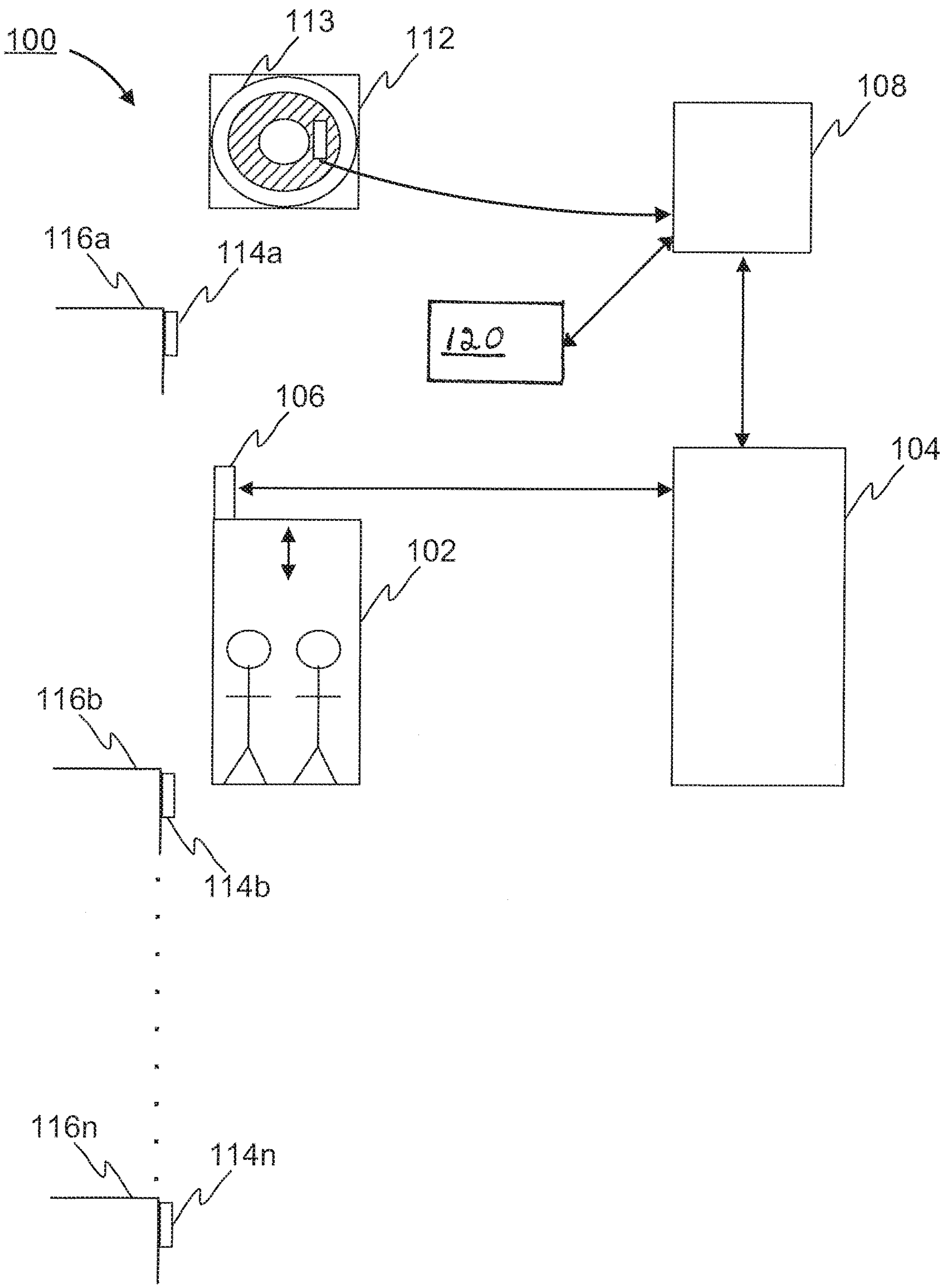
FIG. 1 illustrates schematically an elevator system, wherein the embodiments of the invention may be implemented.

FIG. 1 illustrates schematically an elevator system 100, wherein the embodiments of the invention may be implemented as will be described. The elevator system 100 comprises an elevator control unit 120, an elevator car 102, a safety control unit 104, at least one door zone sensor unit 106, a pulse sensor unit 108, and an overspeed governor (OSG) 112. The at least one door zone sensor unit 106 may be fixed to the elevator car 102, for example on the roof of the elevator car 102, as the door zone sensor unit 106 in FIG. 1. Alternatively, the at least one door zone sensor unit 106 may be fixed below the floor of the elevator car 102 or to a door frame of the elevator car 102. In FIG. 1 the elevator car 102 is moving in vertical direction inside an elevator shaft (not shown in FIG. 1) by means of a hoisting machine (not shown in FIG. 1). The elevator control unit 120, the pulse sensor unit 108 and the at least one door zone sensor unit 106 are communicatively coupled to the safety control unit 104. The communicatively coupling may be provided via an internal bus, for example. Preferably, the communicatively coupling may be provided via a serial bus.

Furthermore, the elevator system 100 comprises at least one door zone magnet 114*a*-114*n* at a door zone of each floor of the elevator shaft. The at least one door zone magnet 114*a*-114*n* is fixed to the elevator shaft. Preferably, the at least one magnet 114*a*-114*n* may be fixed to a landing door frame in the elevator shaft. The door zone may be defined as a zone extending from a lower limit below floor level 116*a*-116*n* to an upper limit above the floor level 116*a*-116*n* in which the landing and car door equipment are in mesh and operable. The door zone may be determined to be from −400 mm to +400 mm for example. Preferably, the door zone may be from −150 mm to +150 mm. Alternatively or in addition, the elevator system 100 according to the invention may comprise at least one terminal magnet at least at one terminal floor of the elevator shaft. The at least one terminal floor may be the top or the bottom floor. Each magnet may comprise at least one passive RFID tag. The at least one RFID tag comprises unique identification code (UID) and type code of the magnet.

Additionally, for safety reasons elevator system may comprise an overspeed governor (OSG) 112 arranged in the elevator shaft to stop the movement of the elevator car 102, if the elevator car 102 speed meets a predefined speed limit. The OSG 112 may comprise a sheave 113 rotated by a governor rope (not shown in FIG. 1) that forms a closed loop and is coupled to the elevator car 102 so that the rope moves with the elevator car 102. The governor sheave 113 may be for example at the upper end of the governor rope loop and is coupled to an actuation mechanism that reacts to the speed of the elevator car 102.

Figure 2:
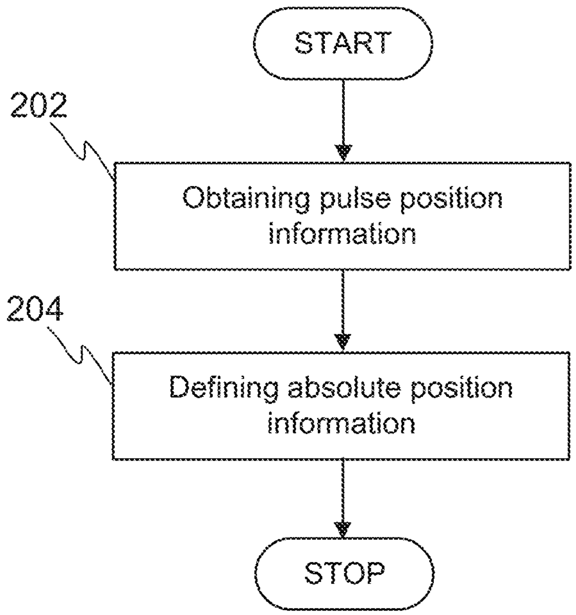
FIG. 2 illustrates schematically an example of a method according to the invention.

Next an example of a method according to the invention is described by referring to FIG. 2. FIG. 2 illustrates schematically an example of a method according to the invention as a flow chart. A pulse position information of an elevator car 102 is obtained at the step 202. The pulse position information may be obtained continuously regardless of the place of the elevator car in the elevator shaft. The pulse position information may be obtained from the pulse sensor unit 108 as will be described later.

In the context of this application the pulse position information means a position information of the elevator car in pulses. At the step 204 an absolute position information of the elevator car 102 is defined by adding a predefined correction value to the obtained pulse position information of the elevator car. The predefined correction value indicates a drift between the obtained pulse position information of the elevator car 102 and the actual pulse position of the elevator car 102. The correction value may be defined during a synchronization run as will be described later. Furthermore, the absolute position information of the elevator car 102 may be scaled into some common unit system, such as SI-units, by dividing the defined absolute position value by a predefined scaling factor. The scaling factor may be defined during a setup run as will be described later.

The setup run is performed before the elevator car 102 may be taken into actual operation. During the setup run the elevator car 102 may be configured to drive first either at the top floor or at the bottom floor and then the elevator car 102 is configured to drive the elevator shaft from one end to the other end. The setup run may comprise obtaining and storing pre-information about the at least one door zone magnet 114*a*-114*n* at the door zone of each floor of the elevator shaft. The pre-information may be stored in a non-volatile memory of the safety control unit. The pre-information may comprise at least the following: floor number, identification code, magnet type, pulse position information, linear position information. The linear position information of the elevator car within the door zone, the floor number, identification code, and magnet type may be obtained from the door zone sensor unit 106 comprising at least one Hall sensor and RFID reader as will be described later. The pulse position information may be obtained from the pulse sensor unit 108 as will be described later. The pulse position information and linear position information may be obtained at mid-point of each door zone magnet.

Alternatively or in addition, the setup run may comprise defining the scaling factor in order to scale the pulse position information obtained from the pulse sensor unit 108 into some common unit system, such as SI-units. Number of pulses per meter, for example, may depend on mechanical arrangements of the rotating member, such as sheave of the OSG and magnet ring or Hall sensor type, for example. The scaling factor may be defined by dividing a pulse position difference between two points within a door zone of the elevator shaft by a linear position difference between said two points within the door zone. The linear position of the elevator car 102 may be obtained from the door zone sensor unit 106.

Furthermore, in order to enhance at least partly the safety of the elevator system 100 the absolute positioning is enabled during a power failure by implementing the absolute positioning independently from a drive control system of the elevator system. The safety control unit 104, door zone sensor unit 106 and pulse sensor unit 108 may be powered by means of an emergency alarm system comprising an emergency battery, which for clarity reason is not shown in FIG. 1. If the power failure takes longer than the battery capacity lasts or if the safety control unit 104 or the pulse sensor unit 108 of the elevator car 102 is reset, the absolute position information of the elevator car 102 is not known. Thus, a synchronization run may be provided in order to define the correction value indicating the drift between the obtained pulse position information of the elevator car 102 and the actual pulse position of the elevator car 102. By defining the correction value, the absolute position information of the elevator car 102 may be defined substantially accurately with the method, the safety control unit, and the elevator system according to the invention.

Figure 3A:
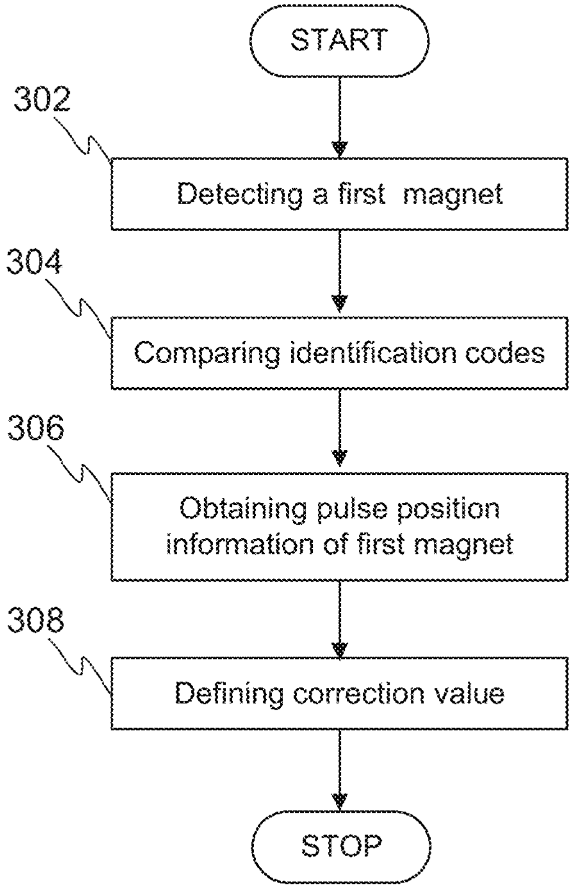
FIG. 3A illustrates schematically an example of a synchronization run according to the invention.

FIG. 3A illustrates schematically an example of a synchronization run according to the invention as a flow chart. The elevator control unit 120 as represented in FIG. 1 is configured to perform the synchronization run as disclosed hereinafter. When the power comes back or after the reset of the safety control unit 104 or the pulse sensor unit 108, the elevator car 102 is configured to travel at a low speed in order to detect a first door zone magnet of the elevator shaft at the step 302. The low speed may be for example less than 0.25 m/s. The identification code of the detected first door zone magnet may be compared to the stored pre-information in order to identify the detected first door zone magnet at the step 304. In other words the identification code of the detected first door zone magnet is compared to the identification codes of the door zone magnets stored as the pre-information during the setup run. The detected door zone magnet may be identified to be the door zone magnet having the same identification code. The pulse position information of door zone magnet corresponding to the detected first door zone magnet is obtained from the stored pre-information at the step 306. The correction value may be defined by subtracting the pulse position information of the elevator car at the detection position of the first door zone magnet from the stored pulse position information of the door zone magnet corresponding to the detected first door zone magnet at the step 308.

Additionally, in response to identification of the first door zone magnet a control signal for a safety device may be generated for controlling the movement of the elevator car 102. The control signal may comprise an instruction to the elevator car 102 to travel up to an elevator rated speed. The elevator rated speed may be defined to be the maximum speed limit defined for the elevator car in question. Alternatively, the control signal may comprise an instruction to the elevator car 102 to travel a buffer rated speed during further steps of the synchronization run. The buffer related speed may be defined to be less than 2.5 m/s, for example.

Figure 3B:
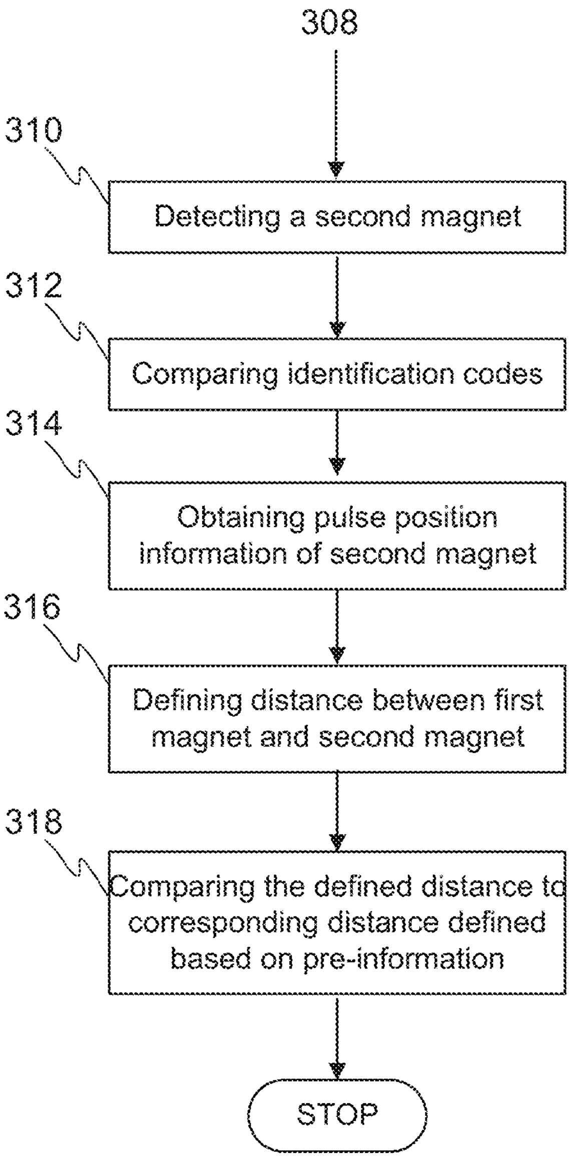
FIG. 3B illustrates schematically an example of further steps of a synchronization run according to the invention.

To ensure that the defined correction value and the defined absolute position information of the elevator car 102 are defined so that SIL3 level accuracy requirements are met, further steps in the synchronization run may be performed. FIG. 3B illustrates schematically an example of further steps of a synchronization run according to the invention as a flow chart. Thus, after step 308 a second door zone magnet of the elevator shaft may be detected at the step 310. The identification code of the detected second door zone magnet may be compared to the stored pre-information in order to identify the detected second door zone magnet at the step 312. The pulse position information of door zone magnet corresponding to the detected second door zone magnet is obtained from the stored pre-information at the step 314. The distance as pulses between the mid-point of the first door zone magnet and the mid-point of the second door zone magnet may be defined at the step 316. The defined distance between the detected first door zone magnet and the detected second door zone magnet may be compared to the corresponding distance defined based on the pre-information at the step 318.

Additionally, a control signal for a safety device may be generated for controlling the movement of the elevator car 102 in response to that the defined distance between the first door zone magnet and the second door zone magnet corresponds to the distance defined based on the pre-information. The control signal may comprise an instruction to the elevator car 102 to travel up to the elevator rated speed.

Figure 4:
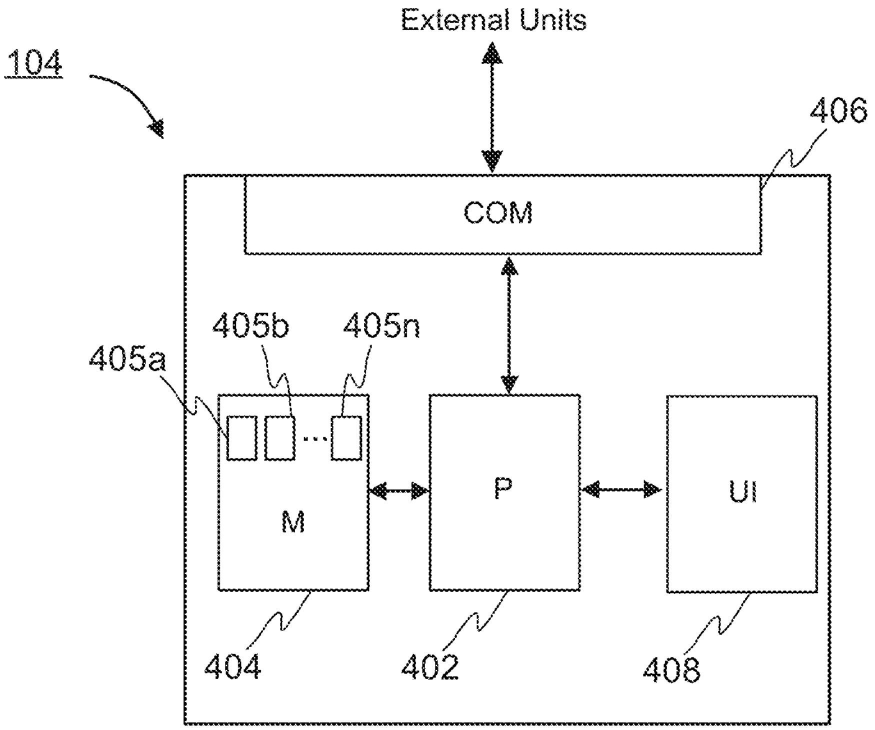
FIG. 4 illustrates schematically an example of a safety control unit according to the invention.

A schematic example of the safety control unit 104 according to the invention is disclosed in FIG. 4. The safety control unit 104 may comprise one or more processors 402, one or more memories 404 being volatile or non-volatile for storing portions of computer program code 405*a*-405*n* and any data values, a communication interface 406 and possibly one or more user interface units 408. The mentioned elements may be communicatively coupled to each other with e.g. an internal bus. The communication interface 406 provides interface for communication with any external unit, such as pulse sensor unit 108, door zone sensor unit 106, database and/or external systems. The communication interface 406 may be based on one or more known communication technologies, either wired or wireless, in order to exchange pieces of information as described earlier.

The processor 402 of the safety control unit 104 is at least configured to implement at least some method steps as described. The implementation of the method may be achieved by arranging the at least one processor 402 to execute at least some portion of computer program code 405*a*-405*n* stored in the memory 404 causing the one processor 402, and thus the safety control unit 104, to implement one or more method steps as described. The processor 402 is thus arranged to access the memory 404 and retrieve and store any information therefrom and thereto. For sake of clarity, the processor 402 herein refers to any unit suitable for processing information and control the operation of the safety control unit 104, among other tasks. The operations may also be implemented with a microcontroller solution with embedded software. Similarly, the memory 404 is not limited to a certain type of memory only, but any memory type suitable for storing the described pieces of information may be applied in the context of the present invention.

Figure 5:
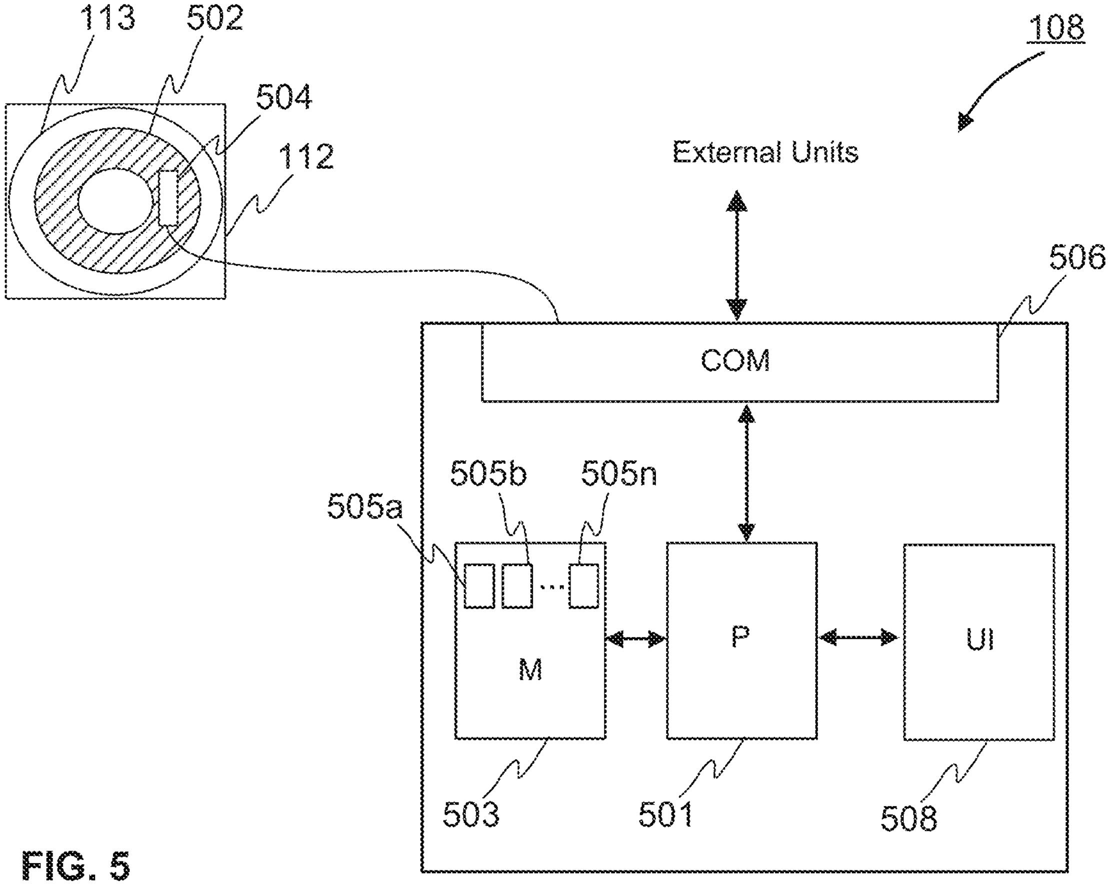
FIG. 5 illustrates schematically an example of the pulse sensor unit according to the invention.

As described the pulse position information of the elevator car 102 may be obtained from the pulse sensor unit 108. A schematic example of the pulse sensor unit 108 according to the invention is disclosed in FIG. 5. In addition, FIG. 5 illustrates at least some of the relating components implemented to measure the pulse position information of the elevator car 102. The related components comprise the OSG 112 and a magnet ring 502 arranged in OSG 112. Alternatively, the magnet ring may also be arranged in a roller guide. The pulse sensor unit 108 may comprise at least one quadrature sensor 504, one or more processors 501, one or more memories 503 being volatile or non-volatile for storing portions of computer program code 505*a*-505*n* and any data values, a communication interface 506 and possibly one or more user interface units 508. The mentioned elements may be communicatively coupled to each other with e.g. an internal bus. The at least one quadrature sensor 504 is configured to measure incremental pulses from the rotating magnet ring 502 arranged in OSG 112 arranged in the elevator shaft. The magnetic ring 502 may comprise alternating evenly spaced north and south poles around its circumference. The at least one quadrature sensor 504 may be a Hall sensor, for example. Furthermore, the at least one quadrature sensor 504 has an A/B quadrature output signal for the measurement of magnetic poles of the magnet ring 502. Furthermore, the at least one quadrature sensor 504 may be configured to detect changes in the magnetic field as the alternating poles of the magnet pass over it. The output signal of the quadrature sensor may comprise two channels A and B that may be defined as pulses per revolution (PPR). Furthermore, the position in relation to the starting point in pulses may be defined by counting the number of pulses. Since, the channels are in quadrature more, i.e. 90 degree phase shift relative to each other, also the direction the of the rotation may be defined. The communication interface 506 provides interface for communication with the at least one quadrature sensor 504 and with any external unit, such as safety control unit 104, door zone sensor unit 106, database and/or external systems. The communication interface 506 may be based on one or more known communication technologies, either wired or wireless, in order to exchange pieces of information as described earlier.

The processor 501 of the pulse sensor unit 108 is at least configured to obtain the quadrature signal from the at least one quadrature sensor, define the pulse position information based on the quadrature signals and to store the defined pulse position information into the memory 503. The processor 502 is thus arranged to access the memory 504 and retrieve and store any information therefrom and thereto. For sake of clarity, the processor 501 herein refers to any unit suitable for processing information and control the operation of the pulse sensor unit 108, among other tasks. The operations may also be implemented with a microcontroller solution with embedded software. Similarly, the memory 503 is not limited to a certain type of memory only, but any memory type suitable for storing the described pieces of information may be applied in the context of the present invention. The pulse sensor unit 108 may be a separate unit communicatively coupled to the safety control unit 104. Alternatively, the pulse sensor unit 108 may be implemented as part of the safety control unit 104 or the pulse sensor unit may be implemented as an additional circuit board operating as an interface between the at least one quadrature sensor 504 and the safety control unit 104.

Figure 6:
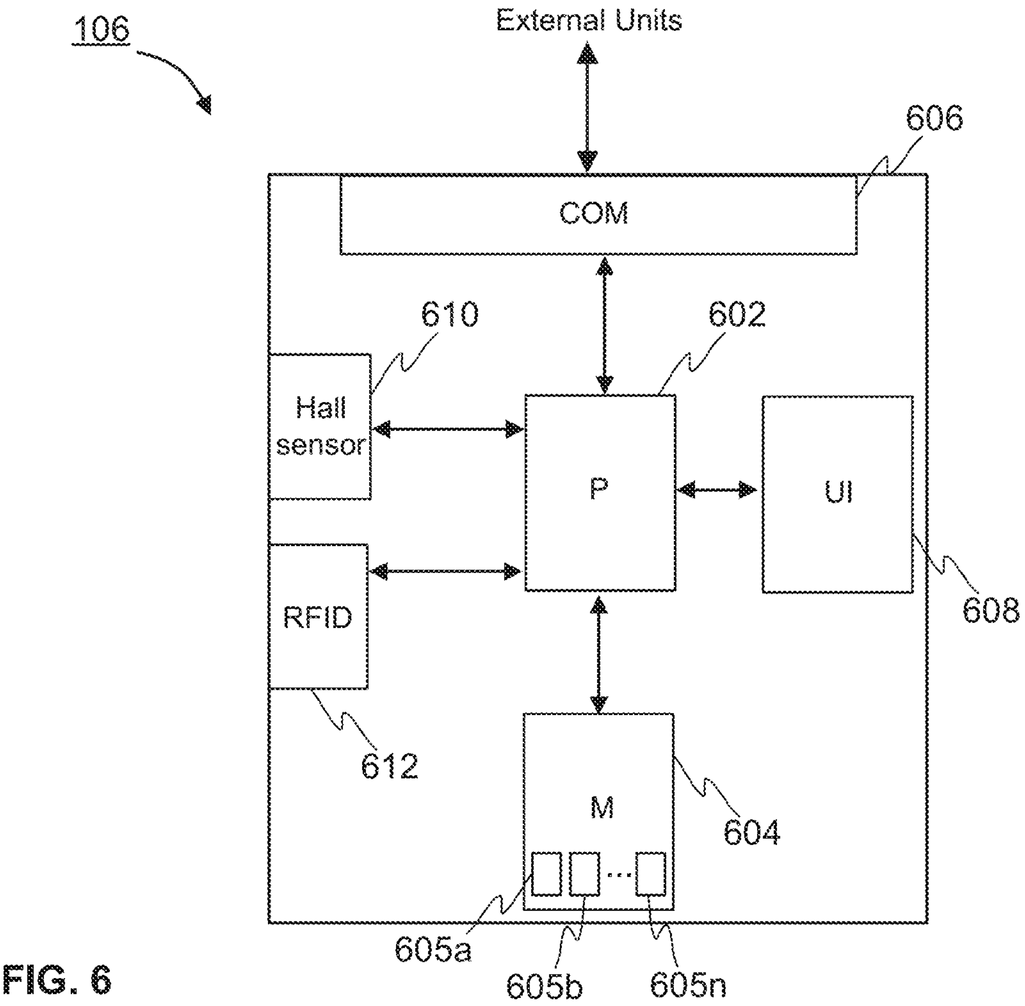
FIG. 6 illustrates schematically an example of the door zone sensor unit according to the invention.

As described at least the linear position information of the elevator car 102 may be obtained from at least one door zone sensor unit 106. Preferably, one door zone sensor unit 106 may be provided for each elevator car door. A schematic example of the at least one door zone sensor unit 106 according to the invention is disclosed in FIG. 6. The door zone sensor unit 106 may comprise at least one Hall sensor 610, RFID reader 612, one or more processors 602, one or more memories 604 being volatile or non-volatile for storing portions of computer program code 605*a*-605*n* and any data values, a communication interface 606 and possibly one or more user interface units 608. The mentioned elements may be communicatively coupled to each other with e.g. an internal bus. The communication interface 606 provides interface for communication with any external unit, such as safety control unit 104, pulse sensor unit 108, database and/or external systems. The communication interface 606 may be based on one or more known communication technologies, either wired or wireless, in order to exchange pieces of information as described earlier. The at least one Hall sensor 610 may be an internal unit as in shown in FIG. 6. Alternatively or in addition, the at least one Hall sensor 610 may be an external unit. Furthermore, the RFID reader 612 may be an internal unit of the door zone sensor unit 106. Alternatively or in addition, the RFID reader 612 may be an external unit.

The processor 602 of the door zone sensor unit 106 is at least configured to provide at least the following door zone information within the door zone of each floor: floor number, magnet type, identification code of the magnet, linear position of the elevator car, speed of the elevator car. The at least one Hall sensor 610 of the door zone sensor unit 106 is configured to obtain the strength of magnetic field as the elevator car 102 bypassing the at least one door zone magnet 114*a*-114*n* at the door zone. Based on the obtained magnetic field strength at least the linear position and the speed of the elevator car 102 within the door zone may be defined. For example, the speed of the elevator car 102 may be defined from a rate of change of the linear position of the elevator car 102 defined from the obtained strength of magnetic field as the elevator car 102 bypasses the at least one door zone magnet 114*a*-114*n* at the door zone. The number of Hall sensors 610 may be determined based on the number of the door zone magnets 114*a*-114*n* at the door zone of each floor 116*a*-116*n*. The RFID reader 612 of the door zone sensor unit 106 is configured to obtain at least the floor number, magnet type and identification code of the magnet from the RFID tag of the at least one door zone magnet 114*a*-114*n*. The door zone information may be obtained only within the door zone of each floor of the elevator shaft.

The processor 602 is arranged to access the memory 604 and retrieve and store any information therefrom and thereto. For sake of clarity, the processor 602 herein refers to any unit suitable for processing information and control the operation of the door zone sensor unit 106, among other tasks. The operations may also be implemented with a microcontroller solution with embedded software. Similarly, the memory 604 is not limited to a certain type of memory only, but any memory type suitable for storing the described pieces of information may be applied in the context of the present invention.

The absolute position information of the elevator car 102 may be defined substantially accurately by means of the method, safety control unit and elevator system as described above. Alternatively or in addition, the absolute position information of the elevator car 102 may be defined at two channels in order to certainly meet the SIL3 level accuracy requirements. In order to define two-channel absolute position information the pulse position information and door zone information may be obtained at two channels. The two-channel pulse position information may be obtained from of the pulse sensor unit 108 comprising one quadrature sensor and at least one processor at each channel. Furthermore, the two-channel door zone information may be obtained from the door zone sensor unit 106 comprising at least one Hall sensor and at least one processor at each channel. The above presented method safety control unit, and elevator system may be implemented for two channels similarly as described above for one channel.

The present invention as hereby described provides great advantages over the prior art solutions. For example, the present invention improves at least partly the safety of the elevators. The present invention enables implementation of an absolute positioning by using already existing door zone sensor unit and safety control unit together with additional substantially inexpensive components, such as magnet ring in OSG, and a pulse sensor unit comprising at least one quadrature sensor. The total costs of the additional components may be substantially less than the total costs of the prior art solutions. Moreover, in the present invention the travelling height is not limited, because the absolute position information may be defined continuously regardless of the place of the elevator car in the elevator shaft without any expensive magnetic tape or similar extending from end to end of the elevator shaft. Furthermore, the present invention enables two-channel absolute positioning for SIL3 safety integrity level that may be required for many safety functions in an elevator system.

The verb "meet" in context of an SIL3 level is used in this patent application to mean that a predefined condition is fulfilled. For example, the predefined condition may be that the SIL3 level accuracy limit is reached and/or exceeded.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A method for performing a synchronization run of an elevator car stopped between floors, the method comprising:

upon initiating the synchronization run, driving the elevator car at a low speed in an elevator shaft, detecting a first magnet fixed to the elevator shaft, comparing an identification code of the detected first magnet to stored pre-information to identify the detected first magnet, in response to identification of the detected first magnet, generating a control signal to the elevator car to raise elevator speed, continuously obtaining pulse position information of the elevator car, and defining absolute position information of the elevator car by adding a predefined correction value to the obtained pulse position information of the elevator car, wherein the predefined correction value indicates drift between the obtained pulse position information of the elevator car and actual pulse position of the elevator car.

2. The method according to claim 1, wherein the control signal controls the elevator car to travel up to an elevator rated speed, and the method further comprising:

driving the elevator car at the elevator rated speed.

3. The method according to claim 1, further comprising:

detecting a second magnet fixed to the elevator shaft, comparing an identification code of the detected second magnet to the stored pre-information to identify the detected second magnet, obtaining from the stored pre-information pulse position information of the second magnet corresponding to the detected second magnet, defining a pulse position distance between the detected first magnet and the detected second magnet, comparing the defined pulse position distance between the detected first magnet and the detected second magnet to a corresponding distance between the first magnet and the second magnet defined based on the stored pre-information to provide a comparison result, and generating the control signal to change the elevator speed in accordance with the comparison result.

4. The method according to claim 2, wherein the elevator rated speed is a maximum speed limit defined for the elevator car or a buffer rated speed.

5. The method according to claim 3, wherein at least one of the first magnet and the second magnet is a door zone magnet.

6. The method according to claim 1, wherein the obtained pulse position information of the elevator car is obtained from a pulse sensor unit comprising:

at least one quadrature sensor measuring incremental pulses from a rotating magnet ring arranged in an overspeed governor arranged in the elevator shaft.

7. The method according to claim 1, wherein the first magnet is a door zone magnet from among a plurality of door zone magnets, and pre-information about at least one door zone magnet of the plurality of door zone magnets at a door zone of each floor of the elevator shaft is obtained and stored during a setup run as the stored pre-information, the pre-information about the at least one door zone magnet comprising at least a floor number, an identification code, a magnet type, pulse position information, and linear position information.

8. The method according to claim 7, wherein the floor number, the identification code, the magnet type, and the linear position information of the elevator car within the door zone of each floor is obtained from at least one door zone sensor unit comprising at least one Hall sensor and a RFID reader.

9. The method according to claim 1, wherein the predefined correction value is defined during the synchronization run, the method further comprising:

obtaining from the stored pre-information the pulse position information of a door zone magnet corresponding to the detected first magnet, and defining the predefined correction value by subtracting the pulse position information of the elevator car at a detection position of the first magnet from the pulse position information of the door zone magnet corresponding to the detected first magnet.

10. The method according to claim 6, comprising defining the absolute position information at two channels of the at least one quadrature sensor.

11. An elevator system for defining the absolute position information of the elevator car, the elevator system comprising:

an elevator control unit, a pulse sensor unit, a door zone sensor unit, and a safety control unit configured to continuously obtain the pulse position information of the elevator car from the pulse sensor unit, and define the absolute position information of the elevator car by adding the predefined correction value to the obtained pulse position information of the elevator car, wherein the elevator control unit, the safety control unit, the door zone sensor unit, and the pulse sensor unit are communicatively coupled to each other, and the elevator control unit is configured to perform the synchronization run according to claim 1.

12. A method of performing a synchronization run of an elevator car stopped between floors of an elevator shaft, the method comprising:

driving the elevator car at a first speed to detect a first magnet from a plurality of magnets fixed to the elevator shaft;

comparing an identification code of the detected first magnet with stored pre-information to identify a magnet from among the plurality of magnets that corresponds to the detected first magnet;

driving the elevator car at a second speed to detect a second magnet from the plurality of magnets fixed to the elevator shaft;

comparing an identification code of the detected second magnet with the stored pre-information to identify a magnet from among the plurality of magnets that corresponds to the detected second magnet;

obtaining pulse position information of the magnet that corresponds to the detected first magnet and pulse position information of the magnet that corresponds to the detected second magnet from the stored pre-information;

determining a pulse position distance between the detected first magnet and the detected second magnet;

comparing the pulse position distance to a first distance between the magnet that corresponds to the detected first magnet and the magnet that corresponds to the detected second magnet to provide a comparison result, the first distance obtained based on the stored pre-information; and generating a control signal to raise elevator speed based on the comparison result.

13. The method according to claim 12, further comprising:

continuously obtaining pulse position information of the elevator car; and defining absolute position information of the elevator car by adding a predefined correction value to the obtained pulse position information of the elevator car, the predefined correction value indicating drift between the obtained pulse position information of the elevator car and actual pulse position of the elevator car.

14. The method according to claim 13, wherein the predefined correction value is defined during the synchronization run, the method further comprising:

defining the predefined correction value by subtracting the pulse position information of the elevator car at a detection position of the detected first magnet from the pulse position information of the magnet that corresponds to the detected first magnet obtained from the stored pre-information.

15. The method of claim 14, wherein the magnet that corresponds to the first magnet is a door zone magnet.

16. The method of claim 12, wherein the control signal is generated to raise the elevator speed responsive to the pulse position distance corresponding to the first distance.

17. The method of claim 12, wherein the second speed is a buffer rated speed greater than the first speed, and the elevator speed is raised to a maximum speed limit of the elevator car greater than the second speed responsive to the control signal.

* * * * *